Feb. 1, 1949.   W. A. KEETCH   2,460,586
ENGINE MOUNTING

Filed March 3, 1945   2 Sheets-Sheet 1

Inventor
William A. Keetch
By Ralph Hammar
Attorney

Feb. 1, 1949.  W. A. KEETCH  2,460,586
ENGINE MOUNTING

Filed March 3, 1945  2 Sheets-Sheet 2

Inventor
William A. Keetch
Ralph Hammar
By
Attorney

Patented Feb. 1, 1949

2,460,586

UNITED STATES PATENT OFFICE 2,460,586

ENGINE MOUNTING

William A. Keetch, Erie, Pa., assignor to Lord Manufacturing Company, Erie, Pa., a corporation of Pennsylvania Application March 3, 1945, Serial No. 580,839

3 Claims. (Cl. 248—5)

1

In engines having cylinders spaced along the crank-shaft such as in line engines or multiple row radial engines, there are forces exciting rocking vibration of the engine about its center of gravity as well as forces exciting vertical, horizontal and torsional vibration. This invention is designed to cushion these vibrations by rubber mountings yielding in shear in planes transverse to the crank-shaft and arranged so the gravity load and vibrations are cushioned in shear.

Figure 1:
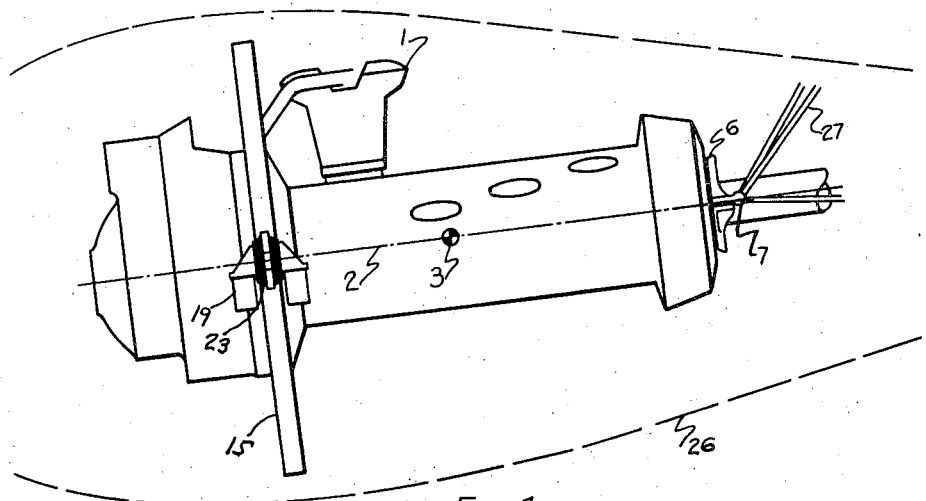
Figure 2:
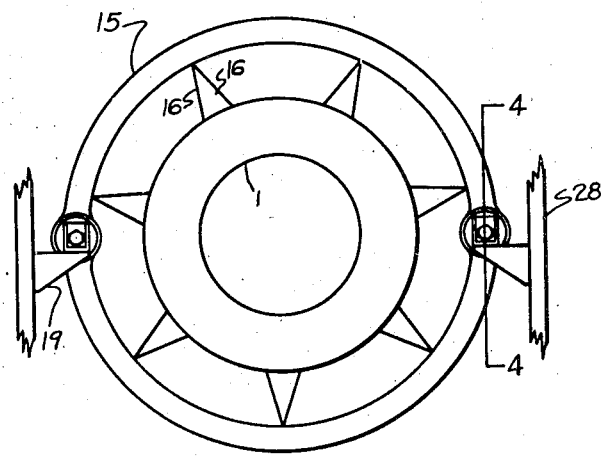
Figure 3:
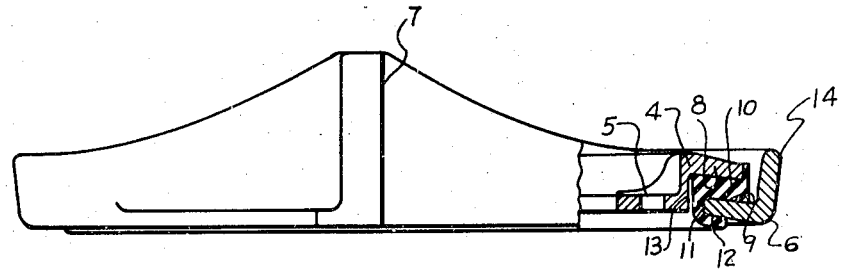
Figure 4:
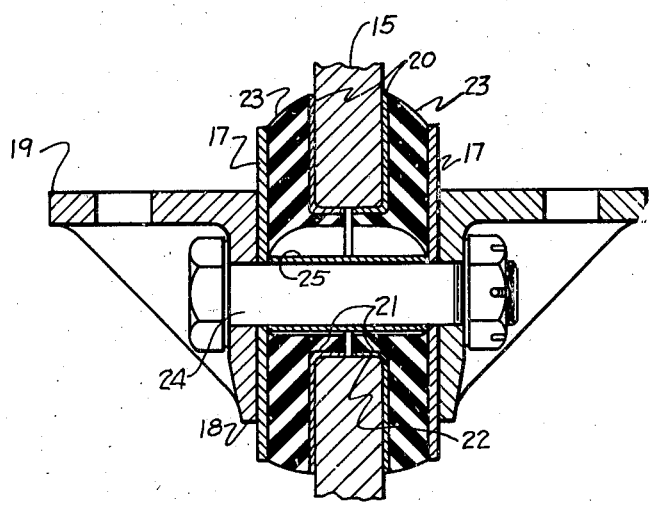

In the drawing, Fig. 1 is a side elevation of the engine mounting; Fig. 2 is an end elevation; Fig. 3 is a fragmentary view partly in section of one of the rubber mountings; and Fig. 4 is a sectional view on line 4—4 of Fig. 2.

In the drawing the mounting is shown applied to a four row radial engine 1. In this type of engine, as in in line engines, in addition to forces exciting vertical and horizontal vibrations, there are forces exciting torsional vibrations about an axis indicated at 2 which is coincident with the axis of the crank-shaft in radial engines and may be displaced from the crank-shaft in in line engines. There are also internal forces due to the reciprocation of the pistons and unevenness in the firing of the cylinders which tend to rock the engine about axes coincident with or close to the center of gravity indicated at 3. In the present invention all of these vibrations are cushioned by rubber mountings arranged to accommodate the vibrations in shear.

At the propeller end the engine is supported by a mounting surrounding the crank-shaft comprising a metal ring 4 having bolt holes 5 for attachment to the engine and a metal ring 6 having lugs 7 at each side for attachment to the supporting structure. The rings 4 and 6 have opposing faces 8 and 9 bonded to opposite sides of a rubber ring 10. The faces 8 and 9 are substantially radial to the crank-shaft so that vibration in any direction in a plane transverse to the crank-shaft is accommodated by shear. The rubber ring 10 extends through the inner edge 11 of the ring 6 and up over the face 12. The rubber beneath the inner edge 11 is spaced from a shoulder 13 on the ring 4 to provide snubbing for large amplitude vibrations. At the outer edge of the ring 6 is a flange 14 overlapping the outer edge of the ring 4 and providing a safety stop in case of failure of the bond between the rubber and the surfaces 8 and 9.

At the other end the engine is connected to a supporting ring 15 by struts indicated diagrammatically at 16. At opposite sides the ring is supported by rubber mountings shown in detail

2 in Fig. 4. The mountings comprise annular sandwiches having outer plates 17 received between ears 18 on brackets 19 for attachment with the supporting structure and inner plates 20 having cylindrical projections 21 fitting in a socket 22 on the engine ring 15. The load is transferred from the engine ring 15 through the plates 20 to rubber rings 23 bonded to the opposing faces of the plates 17 and 20 and is transmitted to the supporting structure through a bolt 24 extending through the lugs 18 and the plates 17. The opposing faces of the plates 17 and 20 are perpendicular to the crank-shaft so that relative movement between the plates in any direction in a plane transverse to the crank-shaft is accommodated by shear of the rubber rings 23.

In Fig. 4 the mounting is shown in the unloaded position in which the rubber between the projections 21 and a spacing sleeve 25 around the bolt 24 is offset so as to provide a greater clearance on the upper side. Under the gravity load of the engine the rubber deflects so as to provide a substantially equal clearance on all sides of the sleeve 25.

The stiffness of rubber rings 10 and 23 is such as to provide the necessary cushioning for vertical and horizontal engine vibrations. For these vibrations the stiffness of the rubber is the primary factor and the location of the mountings with respect to the engine is of less importance. The arrangement of the mountings on opposite sides of the center of gravity of the engine is such that the engine tends to rock in pitch and yaw on the mountings about the center of gravity. The arrangement of the mountings is such that the rocking of the engine is resisted primarily in shear. The torsional vibrations are resisted primarily by shear in the rubber rings 23 due to greater spacing of these rings from the axis of the crank-shaft.

In this mounting the gravity load and all of the engine vibrations are cushioned in shear. The cushioning of the vertical and horizontal vibrations is determined by the stiffness of the rubber. The cushioning of the rocking vibrations is determined by the positioning of the mountings on opposite sides of the center of gravity, the resistance to rocking (pitch and yaw) vibrations being increased as the mountings are moved further from the center of gravity of the engine. The position of the mountings fore and aft along the crank-shaft can be widely varied without affecting the cushioning of the vertical and horizontal vibrations. The torsional vibrations are cushioned primarily by the mountings at the engine ring 16. The cushioning effect is determined primarily by the radial spacing of the mountings from the axis of the crank-shaft. This can be adjusted without materially affecting the cushioning of the other vibrations.

The mounting arrangement is diagrammatically shown applied to an aircraft engine submerged in a wing section 26 and supported at the propeller end by struts 27 attached to the lugs 7 and at the opposite end by struts 28 carrying the brackets 19.

What I claim as new is:

1. In an engine having cylinders spaced along its crankshaft, a three point suspension of rubber sandwich mountings arranged transverse to the crankshaft so as to yield in shear in any direction in planes transverse to the crankshaft and spaced on opposite sides of the center of gravity of the engine, two of the sandwiches being at one end of the engine and spaced on opposite sides of the crankshaft so as to sustain torsional vibrations in shear, and the third sandwich being arranged at the other end of the engine adjacent the crankshaft so as to offer negligible resistance to torsional vibrations.

2. In an engine having cylinders spaced along its crankshaft, rubber mountings at opposite ends of the engine proportioned to support the engine for pitch and yaw about its center of gravity, the mountings comprising rubber sandwiches transverse to the crankshaft yielding in shear in any direction in planes transverse to the crankshaft, and the mountings at one end having sufficiently greater radial spacing from the crankshaft so as to be substantially wholly effective for torsional engine vibrations.

3. In an engine having cylinders spaced along its crankshaft, rubber mountings centered on the axis of torsional vibration of the engine on opposite sides of its center of gravity, the mountings comprising rubber sandwiches transverse to the crankshaft yielding in shear in any direction in planes transverse to the axis and positioned to support the engine about its center of gravity for rocking in any direction, and the mountings at one side of the center of gravity having a radial spacing from the axis such as to be substantially wholly effective for torsional engine vibrations.

WILLIAM A. KEETCH.

REFERENCES CITED

The following references are of record in the file of this patent:

FOREIGN PATENTS

| Number | Country | Date |
|--------|---------|------|
| 849,910 | France | Dec. 5, 1939 |